(12) United States Patent
Flykt et al.

(10) Patent No.: US 7,191,226 B2
(45) Date of Patent: Mar. 13, 2007

(54) IP MOBILITY IN A COMMUNICATION SYSTEM

(75) Inventors: Patrik Flykt, Helsinki (FI); Tapio Suihko, Espoo (FI); Nadarajah Asokan, Espoo (FI); Timo Alakoski, Helsinki (FI)

(73) Assignee: Nokia Corporation, Espoo (FI)

( * ) Notice: Subject to any disclaimer, the term of this patent is extended or adjusted under 35 U.S.C. 154(b) by 650 days.

(21) Appl. No.: 10/130,790

(22) PCT Filed: Nov. 29, 2000

(86) PCT No.: PCT/FI00/01043

§ 371 (c)(1),
(2), (4) Date: May 23, 2002

(87) PCT Pub. No.: WO01/41395

PCT Pub. Date: Jun. 7, 2001

(65) Prior Publication Data
US 2002/0194259 A1    Dec. 19, 2002

(30) Foreign Application Priority Data
Nov. 30, 1999    (FI)    ................................. 19992560

(51) Int. Cl.
*G06F 15/16* (2006.01)
(52) U.S. Cl. ...................... 709/218; 709/249; 370/338; 455/435.1
(58) Field of Classification Search ................ 709/218, 709/227, 246, 249; 370/466, 338; 455/435.1
See application file for complete search history.

(56) References Cited

U.S. PATENT DOCUMENTS 6,172,986 B1    1/2001    Watanuki et al.

(Continued)

FOREIGN PATENT DOCUMENTS

CA    2237370    11/1998

(Continued)

OTHER PUBLICATIONS

Lee et al., "The Next Generation of the Internet: Aspects of the Internet Protocol Version 6," IEEE Network, Jan./Feb. 1998, pp. 28-33.

(Continued)

*Primary Examiner*—Krisna Lim
*Assistant Examiner*—Philip Chea
(74) *Attorney, Agent, or Firm*—Pillsbury Winthrop Shaw Pittman LLP

(57) ABSTRACT

A method for routing data packets to a mobile node in a communication system which includes at least a first subnetwork of a first type supporting a first IP version and a second subnetwork of a second type supporting a second IP version. The mobile node is provided with a set of protocol stacks for handling data packets at least according to the first and the second IP version and with a home address at least according to the first and the second IP version. The home agent intercepts at least data packets addressed to the mobile node's home address according to the first or the second IP version and for encapsulating a data packet addressed to the mobile node in a packet according to the IP version of the foreign network to which the mobile node is attached, for routing the data packet to the mobile node.

10 Claims, 6 Drawing Sheets

U.S. PATENT DOCUMENTS

| | | | |
|---|---|---|---|
| 6,407,988 B1 * | 6/2002 | Agraharam et al. | 370/328 |
| 6,496,704 B2 * | 12/2002 | Yuan | 455/466 |
| 6,535,493 B1 * | 3/2003 | Lee et al. | 370/329 |
| 6,760,444 B1 * | 7/2004 | Leung | 380/270 |

FOREIGN PATENT DOCUMENTS

| | | | |
|---|---|---|---|
| WO | WO 96/21983 | * | 7/1996 |
| WO | WO 98/32301 | * | 7/1998 |
| WO | WO 98/40988 | * | 9/1998 |
| WO | WO 98/43446 | * | 10/1998 |
| WO | WO 99/31846 | | 6/1999 |
| WO | WO 99/59363 | | 11/1999 |
| WO | WO 00/18155 | * | 3/2000 |
| WO | WO 00/59178 | | 10/2000 |

OTHER PUBLICATIONS

Perkins, "Mobile Networking Through Mobile IP," in IEEE Internet Computing, Jan.-Feb. 1998, vol. 2, issue 1, pp. 58-69.

* cited by examiner

IP MOBILITY IN A COMMUNICATION SYSTEM

This is a National Stage application of International Application No. PCT/FI00/01043, which was filed on Nov. 29, 2000, which designated the U.S., and was filed in the English language.

FIELD OF THE INVENTION

The invention relates to mobility support of Internet-type protocol traffic in a communication system.

BACKGROUND OF THE INVENTION

Originally, Internet Protocol (IP) providing access to the Internet was designed for stationary users. Therefore, the basic IP concept does not support user mobility: The IP addresses are assigned to network interfaces depending on their location in the network. In fact, the first part of an IP address (NETID) is common to all interfaces that are linked to the same Internet subnetwork. This scheme prevents a user (a mobile host) from being reachable while moving over different Internet subnetworks, i.e. while changing the physical interface.

In order to enhance mobility on the Internet, Mobile IPs for IP version 4 (MIPv4) and IP version 6 (MIPv6) have been introduced by the Internet Engineering Task Force (IETF) in the standard RFC2002 and in the Internet Draft "Mobility Support in IPv6", 25 Jun. 1999 (work in progress), respectively. A Mobile IP enables a mobile host to change its point of attachment from one Internet subnetwork to another without changing its IP address. The mobile IP introduces the following new functional or architectural entities. For the sake of brevity, the term 'IP' will hereafter refer to Mobile IP.

A 'Mobile Node' (MN) refers to a host that changes its point of attachment from one network or subnetwork to another. A mobile node may change its location without changing its IP address; it may continue to communicate with other Internet nodes at any location using its (constant) IP address.

A 'Correspondent Node' (CN) refers to a peer node with which a mobile node is communicating. The correspondent node may be either mobile or stationary.

A 'Home Network' is the IP network to which a user logically belongs. Physically, it can be, for example, a local area network (LAN) connected via a router to the Internet. A 'Home Address' is an address that is assigned to a mobile node for an extended period of time. It may remain unchanged regardless of where the MN is attached to the Internet. Alternatively, it could be assigned from a pool of addresses.

A 'Home Agent' (HA) is a routing entity that intercepts any packets destined to the mobile node's home address, while the mobile node is away from the home network. The HA encapsulates packets for delivering them to the mobile node, and maintains current location information for the mobile node.

In Mobile IPv4, a 'Foreign Agent' (FA) is a routing entity in a mobile node's visited network, which provides routing services to the mobile node while it is registered in that particular network, thus allowing the mobile node to utilize its home network address. The foreign agent decapsulates the packets that were encapsulated by the mobile node's home agent and delivers them to the mobile node. For datagrams sent by a mobile node, the foreign agent may serve as a default router.

RFC2002 defines a 'Care-of Address' (COA) for Mobile IPv4 as the termination point of a tunnel towards a mobile node for datagrams forwarded to the mobile node while it is away from home. The protocol can use two different types of care-of addresses: a "foreign agent care-of address" is an address announced by a foreign agent with which the mobile node is registered, and a "co-located care-of address" is an externally obtained local address which the mobile node has acquired in the network. An MN may have several COAs at the same time. A COA of a MN is registered with its HA. The list of COAs is updated when the mobile node receives advertisements from foreign agents. If an advertisement expires, its entry or entries should be deleted from the list. One foreign agent can provide more than one COA in its advertisements.

In Mobile IPv6, there is no longer a need to deploy special routers as FAs. Mobile nodes make use of the enhanced features of IPv6 to operate in any location away from home without requiring any special support from their local routers. Most packets sent to a mobile node away from home in Mobile IPv6 are routed using an 'IPv6 Routing' header rather than IP encapsulation, whereas Mobile IPv4 must use encapsulation for all packets. The use of a Routing header requires less overhead for Mobile IP packet delivery from a CN to an MN. To avoid modifying the packet in flight, however, packets intercepted and routed via a mobile node's home agent in Mobile IPv6 must still use encapsulation for delivery. The COA in Mobile IPv6 is the IP address associated with a mobile node while it is visiting a foreign network.

Both in Mobile IPv4 and in Mobile IPv6, the term 'Mobility Binding' is the association of a home address with a care-of address, along with the remaining lifetime of that association. An MN registers its COA with its HA by sending a registration request message. In IPv4, the 'IPv4 Registration Request' message may be relayed to the HA by the foreign agent through which the mobile node is registering, or it may be sent directly to the HA if the mobile node is registering a co-located care-of address. The HA returns an 'IPv4 Registration Reply' message to the mobile node which has sent an IPv4 Registration Request message. If the mobile node has registered by using a foreign agent care-of address, the IPv4 Registration Reply is delivered to the mobile node via the foreign agent. The IPv4 Reply message informs the mobile node about the status of its IPv4 Request. Optional extension fields containing additional information concerning the connection may be included in the IPv4 Registration Request and Reply messages. In IPv6, a mobile node sends a registration request message directly to the HA, and in response to the request message, the HA returns a registration reply message to the mobile node. The registration request and reply messages are included in a 'Destination Options' header, which is used to carry optional information that needs to be examined only by the destination node. The messages are called 'Binding Update' and 'Binding Acknowledge', respectively.

In order to enable full IPv6 functionality of isolated IPv6 nodes in an IPv4 environment, a '6over4' transmission method has been introduced in IETF standard RFC2529. The principle is that IPv6 packets are encapsulated in IPv4 packets for transmission over the IPv4 network between isolated IPv6 nodes.

A real advantage of IPv6 over IPv4 is that the former contains routing optimization by default, i.e. the home agent is involved only when the first datagram is sent to the mobile node on the connection initiation, hence reducing the overhead required. However, an IPv6 network is not available everywhere and not all user terminals are equipped with IPv6 compatibility. Since the addressing schemes in the two versions are incompatible, the IPv4 and IPv6 nodes cannot communicate with each other in a straight-forward manner.

DISCLOSURE OF THE INVENTION

An object of the invention is to develop a method and a communication system which provide mobile nodes with means for communicating over networks supporting different IP versions and with means for being simultaneously addressable with IP addresses according to at least two different IP versions irrespective of the type of the particular network that the mobile node is attached to.

This object is achieved with a method and a system which are characterized by what is disclosed in the attached independent claims. Preferred embodiments of the invention are disclosed in the attached dependent claims.

According to a preferred embodiment of the present invention, a mobile node is arranged to handle data packets at least according to two different IP versions and to have a home address at least according to said two IP versions. The home agent is provided with means for intercepting all data packets destined to the mobile node irrespective of the original IP version of the data packets. In the home agent, a data packet addressed to the mobile node is encapsulated in a packet according to the IP version of the foreign network with which the mobile node is registered, for routing the data packet to the mobile node. This method improves the employment of the network resources.

According to a further preferred embodiment of the present invention, a mobile node is registered with at least a first and a second foreign network so that the respective first and second care-of addresses are simultaneously active in the home agent of the mobile node, and data packets according to at least the first and the second IP version are routed to the mobile node (MN) via the home agent by using the IP version of the first and the second foreign network respectively. This embodiment can be implemented by means of a new extension field in the registration request message. The advantage of this method is smaller overhead in the visited network.

BRIEF DESCRIPTION OF THE DRAWINGS

In the following, the invention will be described in greater detail by means of preferred embodiments with reference to the accompanying drawings, in which.

DETAILED DESCRIPTION OF THE INVENTION

The present invention can be generally applied to a network that includes at least two subnetworks supporting different IP versions for providing IP mobility over the subnetworks. The invention can be used especially preferably for providing IP mobility over IPv4 and IPv6 subnetworks. In the following, preferred embodiments of the invention will be described by means of said IP versions without limiting the invention to these particular IP versions.

The network may be, for example, a local area network (LAN) or any other kind of network providing data connections. The network may be either wireless or fixed. The greatest advantages are achieved in a network providing a relatively slow data connection. The MN may consist of a laptop computer PC connected to a mobile station radio or some other type of mobile workstation construction. Alternatively, the MN can be an integrated combination of a small computer and a cellular telephone, similar in appearance to the Nokia Communicator 9000 series. Yet further embodiments of the MN are various pagers, remote-control, surveillance and/or data-acquisition devices, etc.

Figure 1A:
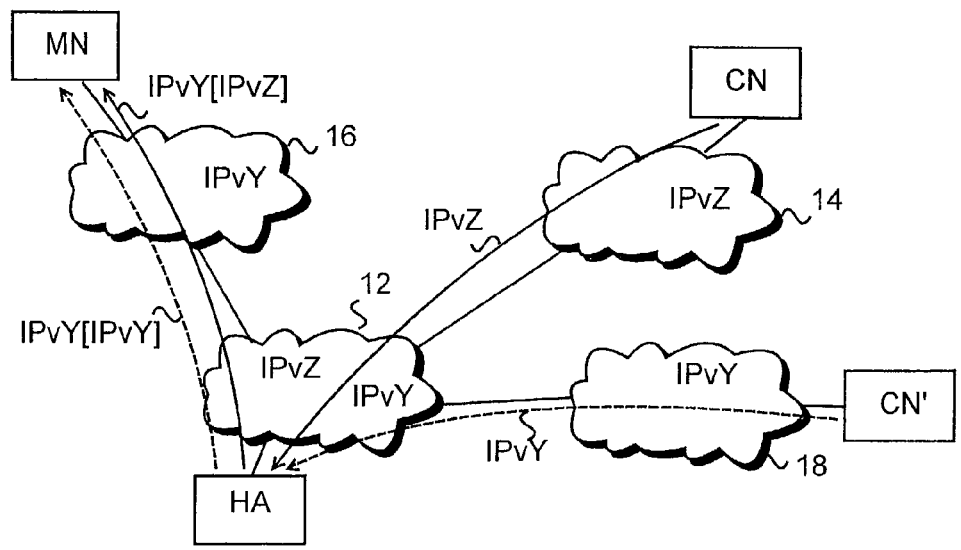
FIGS. 1A and 1B illustrate scenarios where a mobile node in an IPvY foreign network communicates with a correspondent node in an IPvZ subnetwork, Y and Z being different version numbers.
Figure 1B:
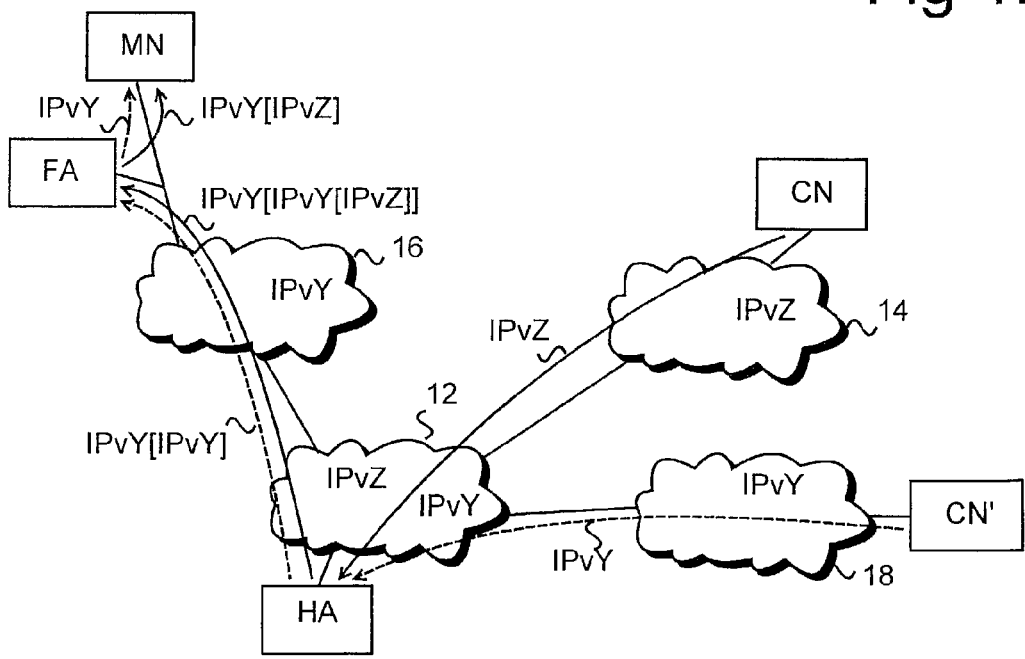

FIGS. 1A and 1B illustrate simplified scenarios where a mobile node MN is attached to a foreign network 16 supporting IP version Y. A correspondent node CN is attached to a subnetwork 14 supporting IP version Z and another correspondent node CN' is attached to a subnetwork 18 supporting IP version Y. The mobile node MN is provided with a home address according to IP versions Y and Z and with means to handle data packets according to both versions. A home agent HA in said mobile node's MN home network 12 intercepts all packets destined to the mobile node MN regardless of their type and the type of the foreign network with which the mobile node MN is registered.

In FIG. 1A, the home agent HA encapsulates an IPvY data packet destined to the mobile node's IPvY home address normally in an IPvY data packet IPvY[IPvY] and an IPvZ data packet destined to the mobile node's IPvZ home address in an IPvY data packet IPvY[IPvZ] for delivery to the mobile node MN. The data packets IPvY[IPvY] and IPvY[IPvZ] are routed directly to the mobile node MN. In FIG. 1B, the mobile node MN is registered with the IPvY foreign network via a foreign agent FA and the data packets are routed to the mobile node MN via the foreign agent FA. The home agent HA encapsulates an IPvY data packet destined to the mobile node's IPvY home address normally in an IPvY data packet IPvY[IPvY] for delivery to the mobile node MN via the foreign agent FA. The home agent HA also encapsulates an IPvZ data packet destined to the mobile node's IPvZ home address in an IPvY packet for the mobile node MN and further in another IPvY packet for the foreign agent FA, resulting in a multiply-encapsulated data packet IPvY[IPvY[IPvZ]]. Therefore, both in FIG. 1A and in FIG. 1B, the correspondent node CN may send data packets according to IP version Z to the mobile node MN without any address transformation, even though the mobile node MN is not attached to a network supporting IP version Z.

Figure 2A:
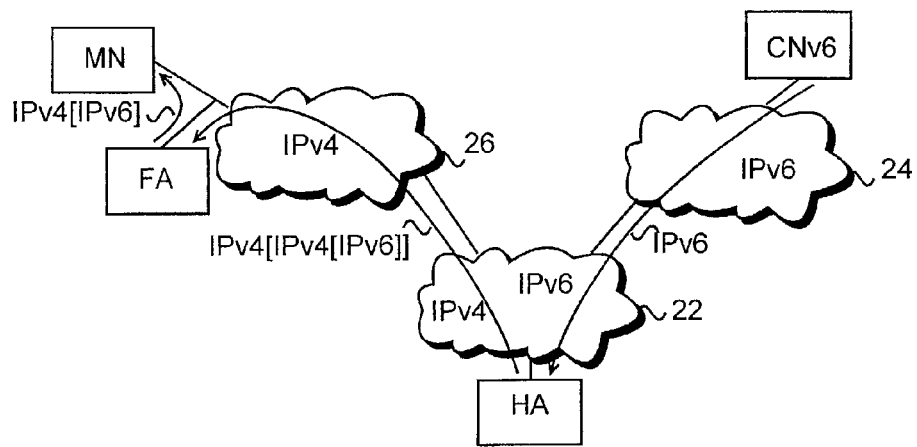
FIGS. 2A and 2B illustrate scenarios where a mobile node is registered with an IPv4 foreign network.
Figure 2B:
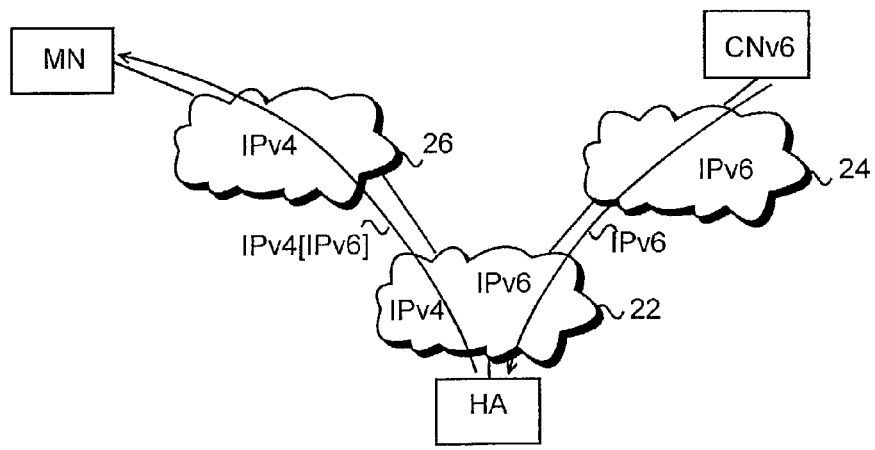
Figure 3:
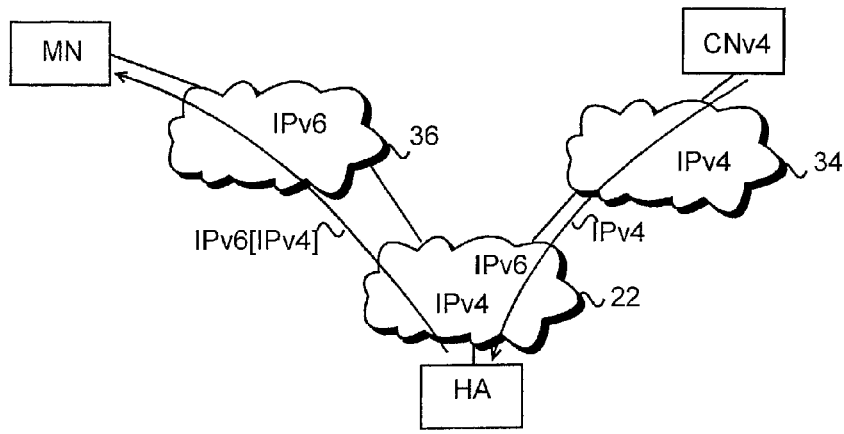
FIG. 3 illustrates a scenario where a mobile node is registered with an IPv6 foreign network.

FIGS. 2A, 2B and 3 illustrate simplified scenarios where a mobile node MN and a correspondent node communicate over IPv4 and IPv6 subnetworks. The mobile node MN is provided with means to operate both in IPv4 and IPv6 networks, i.e. to have an IP address according to both protocol versions. In other words, the mobile node MN is always addressable from an external network by both the IPv4 and the IPv6 address. The mobile node's home agent HA in a home network 22 is arranged to intercept IPv4 and IPv6 packets destined to the mobile node MN regardless of their type. In FIGS. 2A and 2B, the mobile node MN is attached to an IPv4 foreign network 26 and a correspondent node CNv6 is attached to an IPv6 subnetwork 24.

In FIG. 2A, the mobile node MN is registered with the IPv4 foreign network 26 via a foreign agent FA. The home agent HA encapsulates an incoming IPv6 data packet in an IPv4 packet for the mobile node MN and the latter in another IPv4 packet for the foreign agent FA, resulting in a multiply-encapsulated data packet IPv4[IPv4[IPv6]]. In FIG. 2B, the mobile node MN is registered with the IPv4 foreign network without a foreign agent FA. The home agent HA encapsulates an incoming IPv6 data packet in an IPv4 packet for the mobile node MN, resulting in a data packet IPv4[IPv6].

In FIG. 3, the mobile node MN is attached to an IPv6 foreign network 36 and a correspondent node CNv4 is attached to an IPv4 subnetwork 34. The home agent HA encapsulates an incoming IPv4 data packet in an IPv6 packet for the mobile node MN, resulting in a data packet IPv6[IPv4].

Figure 4:
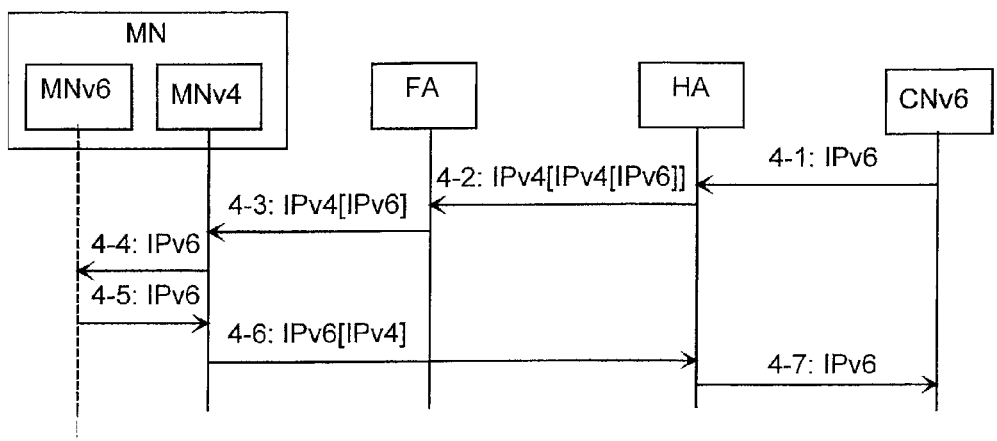
FIG. 4 is a signaling diagram illustrating data transfer between an MN in an IPv4 foreign network and a CN in an IPv6 subnetwork.

FIG. 4 is a signaling diagram illustrating data transfer in a scenario according to FIG. 2A. Prior to the data transfer, the mobile node MN registers normally with the IPv4 foreign network. All IPv4 data packets destined to the mobile node MN are routed normally according to the Mobile IPv4 and therefore are not considered here. In step 4-1, the correspondent node CNv6 sends an IPv6 data packet to the mobile node's MN IPv6 address. The home agent HA intercepts the packet and encapsulates it in an IPv4 packet for the mobile node MN and the latter in another IPv4 packet for the foreign agent FA, resulting in a multiply-encapsulated packet IPv4[IPv4[IPv6]] in step 4-2. The foreign agent FA then decapsulates the outer IPv4 packet and forwards the remaining data packet IPv4[IPv6] to the mobile node MN in step 4-3. In the mobile node MN, the remaining IPv4 packet is decapsulated by an IPv4 stack and the original IPv6 packet is forwarded to an IPv6 stack for normal processing in step 4-4. In the other direction, the IPv6 stack in the mobile node MN produces an IPv6 datagram and forwards it to the IPv4 stack in step 4-5. In step 4-6, the IPv4 stack encapsulates the original IPv6 packet into an IPv4 packet and sends the resulting packet IPv4[IPv6] for example to the home agent HA that decapsulates the IPv4 packet and forwards the original IPv6 packet to the correspondent node CNv6 in step 4-7.

Figure 5:
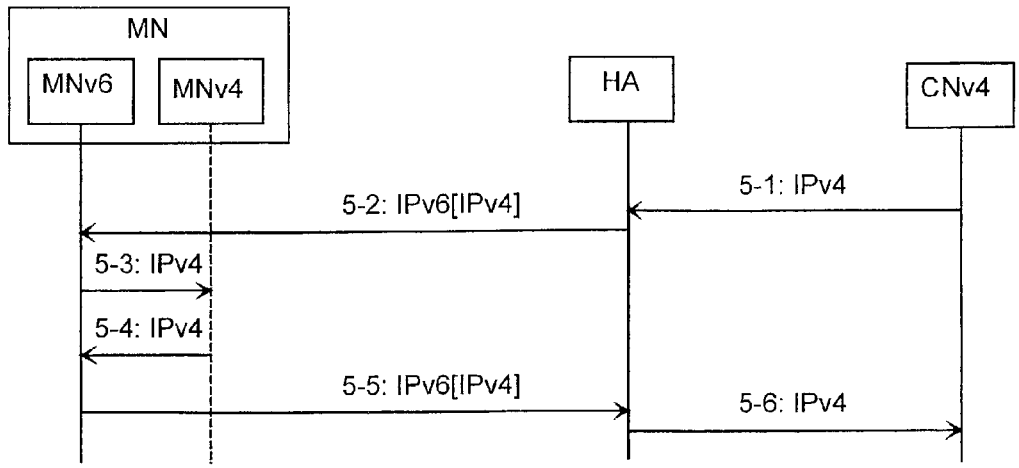
FIG. 5 is a signaling diagram illustrating data transfer between an MN in an IPv6 foreign network and a CN in an IPv4 subnetwork.

FIG. 5 is a signaling diagram illustrating data transfer in a scenario according to FIG. 3. Now the mobile node MN registers with the IPv6 foreign network in a normal way, and all IPv6 data packets destined to the mobile node's MN IPv6 home address are routed normally. In step 5-1, the correspondent node CNv4 sends a data packet IPv4 to the mobile node's MN IPv4 address. The home agent HA intercepts the packet and encapsulates it in an IPv6 packet for the mobile node MN, resulting in a packet IPv6[IPv4] n step 5-2. In the mobile node MN, the IPv6 packet is then decapsulated by an IPv6 stack and the original IPv4 packet is forwarded to an IPv4 stack for normal processing in step 5-3. In the other direction, the IPv4 stack in the mobile node MN produces an IPv4 datagram and forwards it to the IPv6 stack in step 5-4. In step 5-5, the IPv6 stack encapsulates the original IPv4 packet into an IPv6 packet and sends the resulting packet IPv6[IPv4] for example to the home agent HA that decapsulates the IPv6 packet and forwards the original IPv4 packet to the correspondent node CNv4 in step 5-6.

Instead of routing MN-originated packets via the HA (steps 4-6 and 5-5), such packets may be routed via any other router or entity that is equipped with means to identify, decapsulate and forward a packet.

Figure 6A:
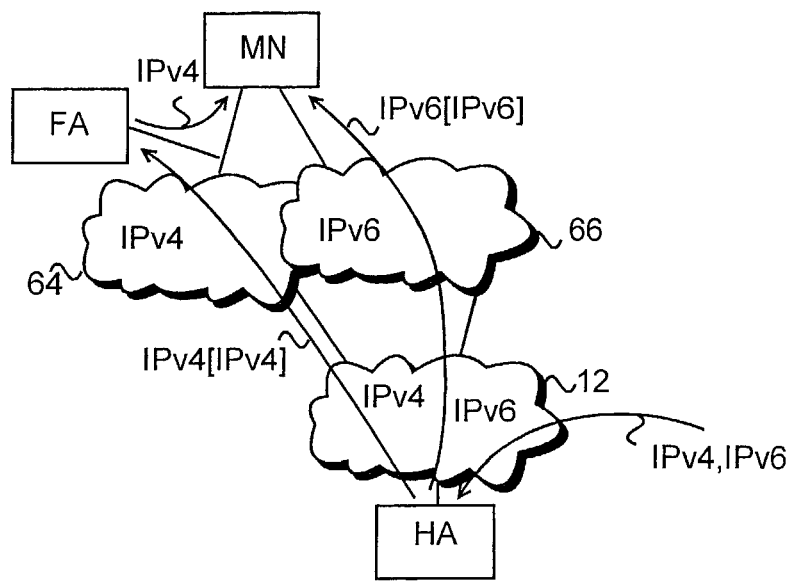
FIGS. 6A and 6B illustrate scenarios where a mobile node registers with both IPv4 and IPv6 foreign networks.
Figure 6B:
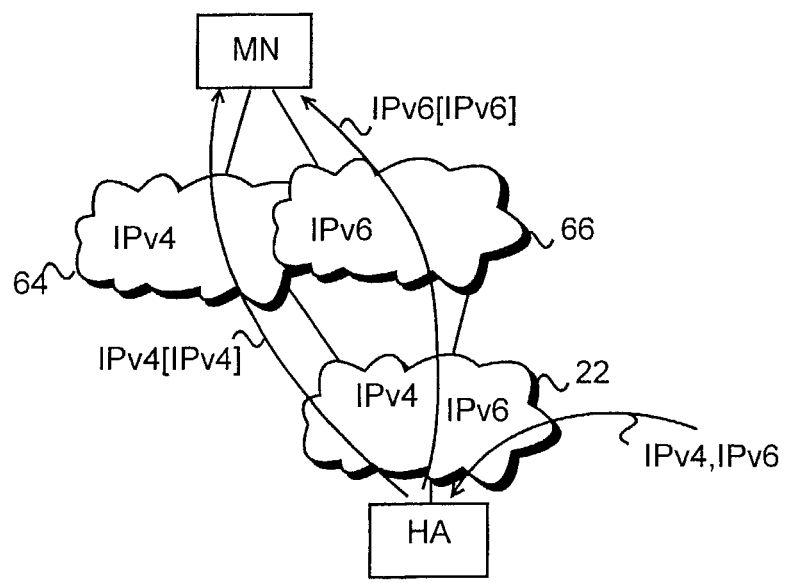

FIGS. 6A and 6B illustrate scenarios according to a further embodiment of the invention. The mobile node MN is registered simultaneously with an IPv4 foreign network 64 and an IPv6 foreign network 66. If both types of foreign networks are available, the mobile node MN retains its attachment to the foreign network it has already registered with and registers also with the other one. Similarly to the scenarios in FIGS. 2A, 2B and 3, the home agent HA intercepts all packets IPv4, IPv6 destined to the mobile node MN regardless of their type. In FIG. 6A, the mobile node MN is registered with the IPv4 foreign network via a foreign agent FA. The home agent HA encapsulates an IPv4 datagram in an IPv4 packet IPv4[IPv4] for the foreign agent FA, which forwards the original IPv4 packet to the mobile node MN. Correspondingly, the home agent HA encapsulates an IPv6 datagram in an IPv6 packet IPv6[IPv6] for the mobile node MN. In FIG. 6B, the mobile node MN is registered with the IPv4 foreign network without a foreign agent FA. Now the home agent HA encapsulates an IPv4 datagram in an IPv4 packet IPv4[IPv4] directly for the mobile node MN. Similarly to FIG. 6A, the home agent HA encapsulates an IPv6 datagram in an IPv6 packet IPv6[IPv6] for the mobile node MN. In this way, unnecessary encapsulations are eliminated and overhead for the foreign networks is reduced.

Figure 7:
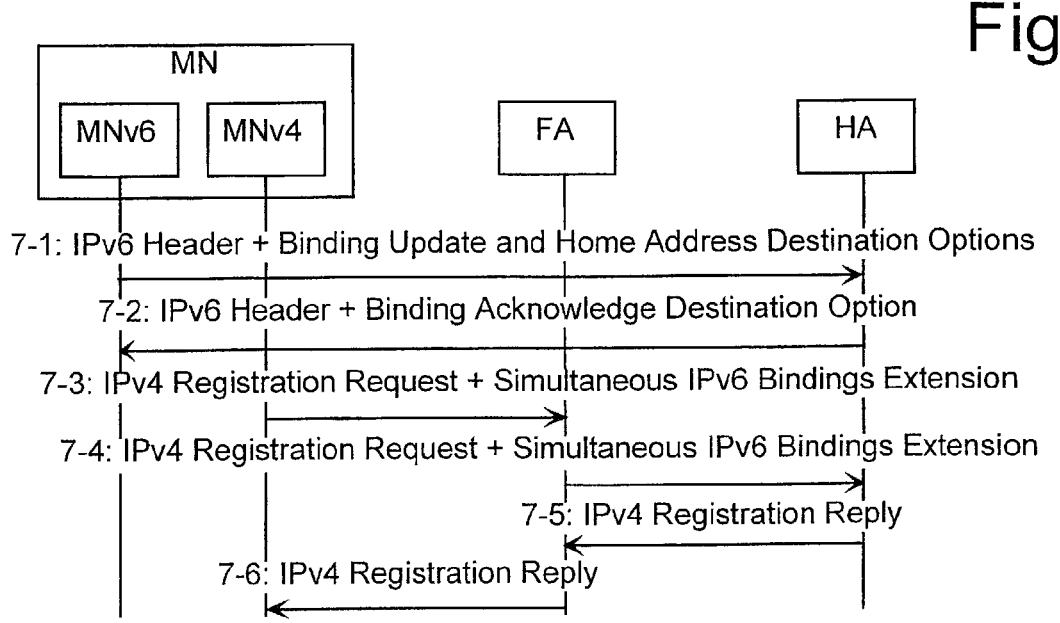
FIG. 7 is a signaling diagram illustrating the registration of the MN when the MN first registers with an IPv6 foreign network.

FIG. 7 is a signaling diagram illustrating the registration of the mobile node MN in a scenario according to FIG. 6A when the mobile node MN first registers with the IPv6 foreign network. Steps 7-1 and 7-2 illustrate normal registration with the IPv6 foreign network. Steps 7-3 to 7-6 illustrate registration with the IPv4 foreign network via a foreign agent with a 'Simultaneous IPv6 Binding' extension. The extension is similar to for example the 'Encapsulating Delivery Style' extension header and includes the IPv6 care-of address that will be used simultaneously with the IPv4 care-of address.

Figure 8:
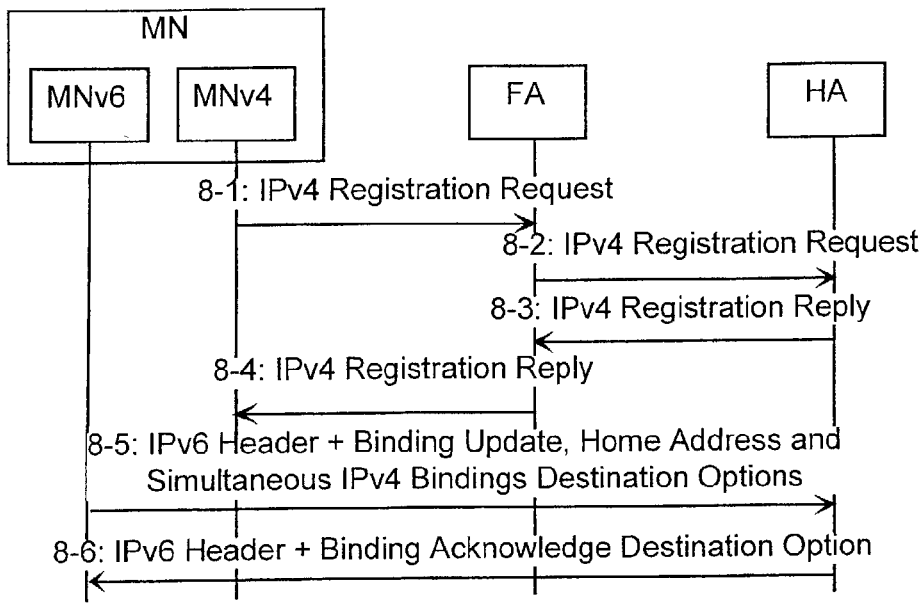
FIG. 8 is a signaling diagram illustrating the registration of the MN when the MN first registers with an IPv4 foreign network.

FIG. 8 is a signaling diagram illustrating the registration of the mobile node MN in a scenario according to FIG. 6A when the mobile node MN first registers with the IPv4 foreign work. Steps 8-1 to 8-4 illustrate normal registration with the IPv4 foreign network via a foreign agent. Steps 8-5 and 8-6 illustrate the registration with the IPv6 foreign network with a 'Simultaneous IPv4 Bindings Destination Option' extension including the IPv4 care-of address that will be used simultaneously with the IPv6 care-of address.

Figure 9:
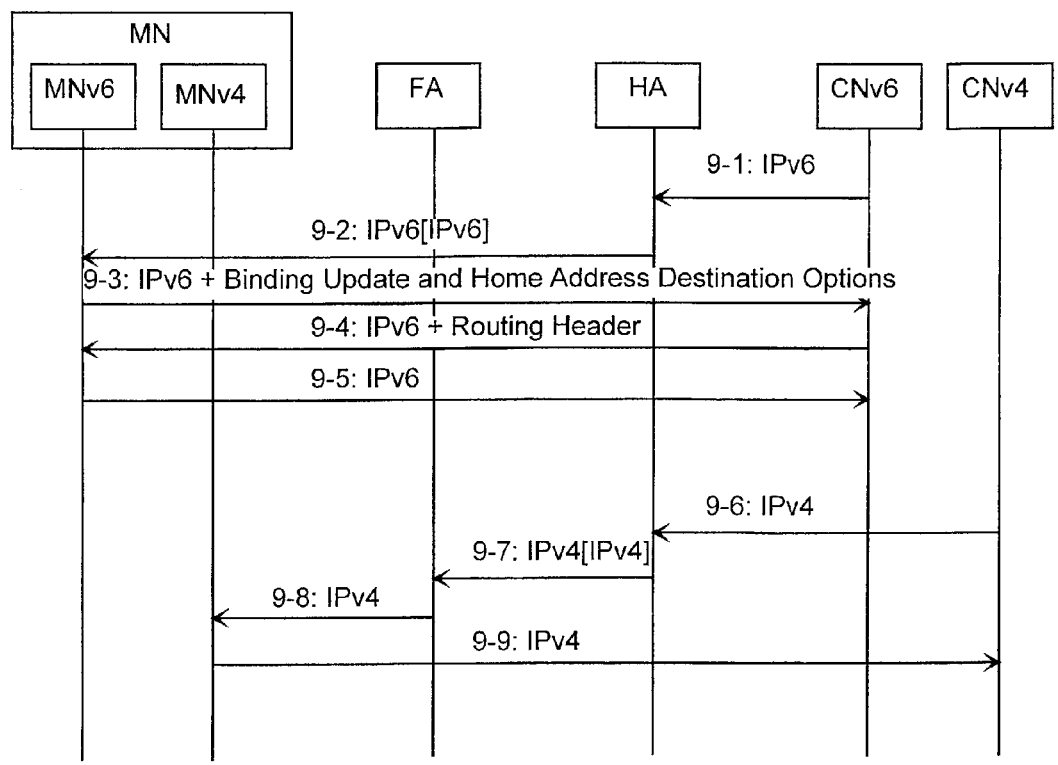
FIG. 9 is a signaling diagram illustrating data transfer when the MN is registered with both IPv4 and IPv6 foreign networks.

In FIG. 9, data transfer in a scenario according to FIG. 6A is illustrated in the form of a signaling diagram. The correspondent node CNv6 sees the mobile node MN as an IPv6 node and the correspondent node CNv4 sees the mobile node MN as an IPv4 node. Steps 9-1 to 9-5 illustrate traffic between the correspondent node CNv6 and the mobile node MN and steps 9-6 to 9-9 illustrate traffic between the correspondent node CNv4 and the mobile node MN.

Figure 10:
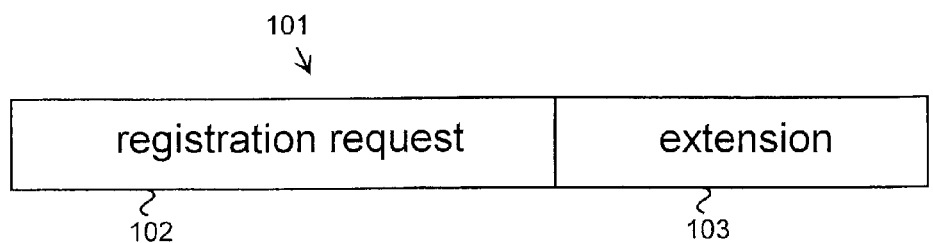
FIG. 10 illustrates a registration request message according to the invention.

FIG. 10 illustrates a registration request message 101 according to the present invention used for simultaneous registration with an IPv4 and an IPv6 foreign network. The first part 102 of the message 101 is a normal registration request. In Mobile IPv4, the part 102 is called an IPv4 Registration Request message, and in Mobile IPv6 said part 102 is called a Binding Update and is included in a Destination Options header. The second part 103 of the message 101 is an extension including the care-of address which is to be used simultaneously with the care-of address according to the first part 102 of the message 101.

This description only illustrates the preferred embodiments of the invention. The invention is not, however, limited to these examples, but it may vary within the scope and spirit of the appended claims.

The invention claimed is:

1. A method for routing data packets to a mobile node in a communication system which includes at least a first subnetwork of a first type supporting a first IP version and a second subnetwork of a second type supporting a second IP version, the method comprising
   attaching the mobile node to a foreign network of the first type supporting only the first IP version, the foreign network having a foreign agent supporting the first IP version
   registering the mobile node's care-of address in the foreign network with a home agent located in said mobile node's home network;
   providing the mobile node with a set of protocol stacks for handling data packets at least according to the first and the second IP version so that the mobile node supports both the first IP version and the second IP version;
   providing the mobile node with a home address at least according to the first and the second IP version;
   providing the home agent with means for intercepting at least data packets addressed to the mobile node's home address according to the first and the second IP version so that the home agent supports both the first IP version and the second IP version; and
   encapsulating in the home agent a data packet addressed to the mobile node's home address according to the second IP version in a packet according to the first IP version, thereby providing an encapsulated data packet,
   encapsulating in the home agent the encapsulated data packet in a further data packet according to the first IP version, thereby providing a twice-encapsulated data packet,
   routing the twice-encapsulated data packet to the foreign agent of the foreign network of the first type
   decapsulating the twice-encapsulated data packet in the foreign agent, thereby extracting the encapsulated data packet,
   routing the extracted encapsulated data packet to the mobile node over the foreign network of the first type,
   decapsulating the restored extracted data packet in the mobile node, thereby extracting the data packet addressed to the mobile node's home address according to the second IP version.

2. A method according to claim 1, comprising
   attaching the mobile node at least to a foreign network of the second type supporting only the second IP version, said foreign network of the second type having a second foreign agent supporting the second IP version;
   registering at least the mobile node's care-of address in the foreign network of the second type with the home agent, so that the care-of addresses at least in the foreign networks of the first and the second type are simultaneously active in the home agent of said mobile node; and
   encapsulating in the home agent at least a data packet addressed to the mobile node's home address according to the first IP version in a data packet according to the second IP version, thereby providing a second encapsulated data packet,
   encapsulating in the home agent the second encapsulated data packet in a further data packet according to the second IP version, thereby providing a second twice-encapsulated data packet,
   routing the second twice-encapsulated data packet to the second foreign agent of the foreign network of the second type;
   decapsulating the second twice-encapsulated data packet in the second foreign agent, thereby extracting the second encapsulated data packet,
   routing the extracted second encapsulated data packets to the mobile node over the foreign network of the second type,
   decapsulating the extracted second encapsulated data packet in the mobile node, thereby extracting the data packet addressed to the mobile node's home address according to the second IP version.

3. A method according to claim 2, wherein said registering the mobile node with the foreign network of the second type comprises using a registration request message which includes an extension containing at least the care-of address of the mobile node in said foreign network of the first type.

4. A method according to claim 1, wherein the first IP version is IPv4 and the second IP version is IPv6.

5. A method according to claim 1, wherein the first IP version is IPv6 and the second IP version is IPv4.

6. A communication system for routing data packets to a mobile node, the system comprising
   a mobile node supporting both the first IP version and the second IP version and provided with a home address at least according to the first and the second IP version; and
   at least a first subnetwork of a first type supporting the first IP version and a second subnetwork of a second type supporting the second IP version, wherein the first subnetwork is the mobile node's foreign network;
   a first foreign agent in the first subnetwork,
   a home agent located in the mobile node's home network, for registering the mobile node's care-of address in the foreign network;
   the home agent comprising
   (a) a mechanism configured to intercept at least data packets addressed to the mobile node's home address according to both the first and the second IP version; and
   (b) a mechanism configured to encapsulate a data packet addressed to the mobile node's home address according to the second IP version in a packet according to the first IP version, and to thereby provide an encapsulated data packet,
   (c) a mechanism configured to encapsulate the encapsulated data packet in a further data packet according to the first IP version, to thereby provide a twice-encapsulated data packet,
   (d) a mechanism configured to send the twice-encapsulated data packet to the foreign agent,
   the foreign agent comprising
   (e) a mechanism configured to decapsulate the twice-encapsulated data packet in the foreign agent, to thereby extract the encapsulated data packet,
   (f) a mechanism configured to send the extracted encapsulated data packet to the mobile node over the foreign network supporting only the first IP version, to be decapsulated by the mobile node.

7. A communication system according to claim 6, wherein the home agent further comprises a mechanism configured to accept a registration of at least a second care-of address of the mobile node in a foreign network of the second type, so that the care-of addresses at least in the foreign networks of the first and the second type are simultaneously active in the home agent, said foreign network of the second type having a second foreign agent supporting the second IP version; and a mechanism configured to encapsulate at least a data packet addressed to the mobile node's home address according to the first IP version in a data packet according to the second IP version in a data packet according to the second IP version, thereby providing a second encapsulated data packet, a mechanism configured to encapsulate the second encapsulated data packet in a further data packet according to the second IP version, thereby providing a second twice-encapsulated data packet, a mechanism configured to send the second twice-encapsulated data packets to the second foreign agent.

8. A home agent for routing data packets to a mobile node in a communication system which includes at least a first subnetwork of a first type supporting only a first IP version and at least a second subnetwork of a second type supporting a second IP version, and a first and second foreign agent in the first and second subnetworks, respectively, the home agent being configured to cooperate with a mobile node which is provided with (a) a set of protocol stacks for handling data packets at least according to the first and the second IP version, and (b) a home address at least according to the first and the second IP version so that the mobile node supports both the first IP version and the second IP version; the home agent being located in the mobile node's home network and comprising a mechanism configured to accept a registration of the mobile node's first care-of address in a foreign network of the first type to which the mobile node is attached so that the home agent supports both the first IP version and the second IP version;

a mechanism configured to intercept at least data packets addressed to the mobile node's home address according to both the first and the second IP version; and a mechanism configured to encapsulate a data packet addressed to the mobile node's home address according to the second IP version in a packet according to the first IP version, and to thereby provide an encapsulated data packet, a mechanism configured to encapsulate the encapsulated data packet in a further data packet according to the first IP version, to thereby provide a twice-encapsulated data packet, and a mechanism configured to the twice-encapsulated data packet to the foreign agent.

9. A home agent according to claim 8, comprising a mechanism configured to accept a registration of the mobile node's second care-of address in a foreign network of the second type, so that the care-of addresses at least in the foreign networks of the first and the second type are simultaneously active in the home agent; and to a mechanism configured to encapsulate at least a data packet addressed to the mobile node's home address according to the first IP version in a data packet according to the second IP version, thereby providing a second encapsulated data packet, a mechanism configured to encapsulate the second encapsulated data packet in a further data packet according to the second IP version, thereby providing a second twice-encapsulated data packet, a mechanism configured to send the second twice-encapsulated data packet to the second foreign agent.

10. A mobile node for a communication system which includes at least a first subnetwork of a first type supporting a first IP version and at least a second subnetwork of a second type supporting a second IP version, and a first and second foreign agent in the first and second subnetworks, respectively, the mobile node comprising a mechanism configured to attach to a foreign network of the first type; and to a mechanism configured to register its care-of address in the foreign network with a home agent located in said mobile node's home network;

a set of protocol stacks for handling data packets at least according to the first and the second IP version so that the mobile node supports both the first IP version and the second IP version;

a home address at least according to the first and the second IP version;

a mechanism configured to attach at least to a foreign network of a second type supporting only the second IP version;

a mechanism configured to register a care-of address in the foreign network of the second type with the home agent, so that the care-of addresses at least in the foreign networks of the first and the second type are simultaneously active in the home agent of the mobile node;

a mechanism configured to cooperate with the home agent which supports both the first IP version and the second IP version and is provided with means for intercepting at least data packets addressed to the mobile node's home address according to the first or the second IP version; and a mechanism configured to cooperate with the home agent which encapsulates at least a data packet addressed to the mobile node's home address according to the second IP version in a data packet according to the first IP version to thereby provide an encapsulated data packet, encapsulates the encapsulated data packet in a further data packet according to the first IP version, to thereby provide a twice-encapsulated data packet, and routes the twice-encapsulated data packet to the foreign agent.

* * * * *